US008958026B2

(12) United States Patent
Park et al.

(10) Patent No.: US 8,958,026 B2
(45) Date of Patent: Feb. 17, 2015

(54) DISPLAY APPARATUS HAVING PARTICULAR CONTROLLABLE SHAPE DEFORMING/MAINTAINING UNIT

(71) Applicant: Samsung Display Co., Ltd., Yongin, Gyeonggi-do (KR)

(72) Inventors: Yeon-Hee Park, Yongin (KR); Soo-In Cho, Yongin (KR); Woo-Jong Lee, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 199 days.

(21) Appl. No.: 13/754,884

(22) Filed: Jan. 30, 2013

(65) Prior Publication Data

US 2013/0329422 A1 Dec. 12, 2013

(30) Foreign Application Priority Data

Jun. 11, 2012 (KR) .......................... 10-2012-0062351

(51) Int. Cl.
*G02F 1/1333* (2006.01)
*B60Q 1/124* (2006.01)
*F21V 23/04* (2006.01)

(52) U.S. Cl.
CPC ...... *F21V 23/0471* (2013.01); *G02F 1/133305* (2013.01); *G02F 1/133308* (2013.01)
USPC ............................... 349/58; 349/60; 362/233

(58) Field of Classification Search
CPC ................... G02F 1/133308; G02F 1/133608; G02F 1/13452; G02F 2001/503; B60Q 1/124; B60Q 1/068; F21W 2131/406

USPC ........................................ 349/58, 60; 362/233
See application file for complete search history.

(56) References Cited

U.S. PATENT DOCUMENTS

| 8,736,162 B2* | 5/2014 | Jin et al. ........................ 313/511 |
| 2011/0095975 A1 | 4/2011 | Hwang et al. |
| 2013/0002572 A1* | 1/2013 | Jin et al. ........................ 345/173 |
| 2013/0021762 A1 | 1/2013 | van Dijk et al. |
| 2013/0180882 A1 | 7/2013 | Hamers et al. |

FOREIGN PATENT DOCUMENTS

| EP | 2 530 556 A1 | 12/2012 |
| EP | 2 546 721 A2 | 1/2013 |
| JP | 2003-280546 | 10/2003 |

(Continued)

OTHER PUBLICATIONS

Korean Patent Abstracts of KR 10-2002-0065108 A related to KR 20-0238199, 1 page.

(Continued)

*Primary Examiner* — Mike Qi
(74) *Attorney, Agent, or Firm* — Christie, Parker & Hale, LLP

(57) ABSTRACT

A display apparatus is disclosed. The display apparatus includes a flexible display panel and a shape deforming/maintaining unit. The flexible display panel is configured to operate in a flat mode and in a curved mode. The shape deforming/maintaining unit is on a surface of the flexible display panel. The shape deforming/maintaining unit is configured to deform a shape of the flexible display panel during switching between the flat mode and the curved mode, and to maintain rigidity of the flexible display panel after switching to the flat mode or to the curved mode.

30 Claims, 6 Drawing Sheets

(56) References Cited

FOREIGN PATENT DOCUMENTS

| | | |
|---|---|---|
| KR | 20-0238199 | 9/2001 |
| KR | 20-2010-0000355 | 1/2010 |
| KR | 10-2010-0041550 | 4/2010 |
| KR | 10-2010-0113869 | 10/2010 |
| KR | 10-1007679 | 1/2011 |
| KR | 10-2011-0048640 | 5/2011 |
| TW | 200839679 | 10/2008 |

OTHER PUBLICATIONS

Korean Patent Abstracts of KR 10-2010-0130344 A related to KR 10-1007679, 1 page.
EPO Search Report dated Jul. 29, 2013, for corresponding European Patent application 13162844.8, (6 pages).
KIPO Office action dated Sep. 12, 2013, for Korean priority Patent application 10-2012-0062351, (5 pages).
Korean Registration Determination Certificate for Application No. KR 10-2012-0062351, dated May 20, 2014, 2 pages.

* cited by examiner

DISPLAY APPARATUS HAVING PARTICULAR CONTROLLABLE SHAPE DEFORMING/MAINTAINING UNIT

CROSS-REFERENCE TO RELATED PATENT APPLICATION

This application claims priority to and the benefit of Korean Patent Application No. 10-2012-0062351, filed on Jun. 11, 2012 in the Korean Intellectual Property Office, the entire content of which is incorporated herein by reference.

BACKGROUND

1. Field

Aspects of embodiments of the present invention relate to a display apparatus.

2. Description of the Related Art

As the standard of living is being improved, the sizes of display apparatuses, such as TVs, are being increased. Large-size display apparatuses are mainly display apparatuses embodying flat screens. However, for a large-size flat panel display apparatus, the user/viewer pays less attention to edges of the screen.

SUMMARY

Embodiments of the present invention provide for a display apparatus including a flexible display panel capable of operating in a flat mode and in a curved mode.

According to an exemplary embodiment of the present invention, a display apparatus is provided. The display apparatus includes: a flexible display panel configured to operate in a flat mode and in a curved mode; and a shape deforming/maintaining unit on a surface of the flexible display panel and configured to deform a shape of the flexible display panel during switching between the flat mode and the curved mode, and to maintain rigidity of the flexible display panel after switching to the flat mode or to the curved mode.

The shape deforming/maintaining unit may be on a surface of the flexible display panel opposite to a surface for displaying images.

In the curved mode, curvatures of the flexible display panel at two opposite sides in a horizontal direction may be symmetrical about a center portion of the flexible display panel.

In the curved mode, curvature from a center portion of the flexible display panel toward a first side of the flexible display panel in a horizontal direction may be greater than curvature from the center portion of the flexible display panel toward a second side of the flexible display panel in the horizontal direction.

In the curved mode, curvature from a center portion of the flexible display panel toward a first end of the flexible display panel in a vertical direction may increase.

The shape deforming/maintaining unit may include: a first electrode divided into a plurality of parts; a second electrode, which is a common electrode facing the first electrode; and an actuator between the first electrode and the second electrode. Shapes of the flexible display panel for switching between the flat mode and the curved mode may be determined according to voltages applied to the actuator.

The shape deforming/maintaining unit may have flexibility at a voltage level for changing a shape of the actuator and may have rigidity at a voltage level for not changing the shape of the actuator.

The display apparatus may further include a panel supporting unit for supporting a weight of the flexible display panel.

The panel supporting unit may include a movement guide for relocating a center portion of the flexible display panel.

The panel supporting unit may be configured to relocate the center portion of the flexible display panel on a plane.

The panel supporting unit may be configured to relocate the center portion of the flexible display panel in a direction parallel to the flexible display panel when in the flat mode.

The flexible display panel may include liquid crystal devices or organic light-emitting devices.

According to another exemplary embodiment of the present invention, a display apparatus is provided. The display apparatus includes a flexible display panel configured to operate in a flat mode and in a curved mode, a shape deforming/maintaining unit on a surface of the flexible display panel, and a control unit for controlling the shape deforming/maintaining unit to operate in the flat mode or in the curved mode.

The control unit may be configured to control the shape deforming/maintaining unit to deform a shape of the flexible display panel during switching between the flat mode and the curved mode, and to maintain rigidity of the flexible display panel after switching to the flat mode or to the curved mode.

The control unit may be configured to control curvature of the flexible display panel by controlling voltages respectively applied to locations of the shape deforming/maintaining unit.

The display apparatus may further include a panel supporting unit for supporting a weight of the flexible display panel. The control unit may be configured to control the panel supporting unit to relocate a center portion of the flexible display panel.

The control unit may be configured to control curvature and location of the flexible display panel, such that a distance between a viewer and sides of the flexible display panel in the curved mode is smaller than a distance between the viewer and the sides of the flexible display panel in the flat mode.

The control unit may be configured to be controlled by control instructions received from a remote control.

The control unit may be configured to control curvature of the flexible display panel based on human motion.

The display apparatus may further include a sensor for detecting the human motion.

The sensor may be a face detecting sensor, a retina detecting sensor, or a motion detecting sensor.

According to yet another exemplary embodiment of the present invention, a display apparatus is provided. The display apparatus includes: a flexible display panel configured to operate in a flat mode and in a curved mode; a panel supporting unit for supporting a weight of the flexible display panel; and a shape deforming/maintaining unit on a surface of the flexible display panel and configured to deform a shape of the flexible display panel during switching between the flat mode and the curved mode, and to maintain rigidity of the flexible display panel after switching to the flat mode or to the curved mode. A distance between a viewer and sides of the flexible display panel in the curved mode is smaller than a distance between the viewer and the sides of the flexible display panel in the flat mode.

The flexible display panel may include first and second long sides extending substantially in parallel to a ground surface and first and second short sides extending in a direction substantially perpendicular to the first and second long sides. Curvature of the flexible display panel may increase toward the first and second short sides in the curved mode.

In the curved mode, curvatures of the flexible display panel from a center portion toward each of the first and second short sides may be symmetrical with each other.

In the curved mode, curvatures of the flexible display panel from a center portion of the flexible display panel toward each of the first and second short sides of the flexible display panel may be asymmetrical with each other.

The flexible display panel may include first and second long sides extending in a direction substantially vertical to a ground surface and first and second short sides extending in a direction substantially perpendicular to the first and second long sides. The first short side may be above the second short side. Curvature of the flexible display panel may increase toward the first short side in the curved mode.

The flexible display panel may be configured to move in a direction substantially vertical to a ground surface.

The shape deforming/maintaining unit may include: a first electrode divided into a plurality of parts; a second electrode, which is a common electrode facing the first electrode; and an actuator between the first electrode and the second electrode. Shapes of the flexible display panel for switching between the flat mode and the curved mode may be determined according to voltages applied to the actuator.

The shape deforming/maintaining unit may have flexibility at a voltage level for changing a shape of the actuator and may have rigidity at a voltage level for not changing a shape of the actuator.

The flexible display panel may include a first flexible substrate, a second flexible substrate facing the first flexible substrate, and an organic light-emitting device between the first flexible substrate and the second flexible substrate.

BRIEF DESCRIPTION OF THE DRAWINGS

The above and other features and aspects of the present invention will become more apparent by describing in detail exemplary embodiments thereof with reference to the attached drawings in which:

FIGS. 6(a) and 6(b), is a schematic top view showing a relationship between the display apparatus and the viewer when the viewer is off the line extending from the center portion of the display apparatus;

DETAILED DESCRIPTION

Aspects of the present invention will now be described more fully with reference to the accompanying drawings, in which exemplary embodiments of the invention are shown. The present invention may, however, be embodied in many different forms and should not be construed as being limited to the embodiments set forth herein; rather, these embodiments are provided to more fully convey aspects and concepts of the invention to those skilled in the art. The terminology used herein is for describing particular embodiments only and is not intended to be limiting of the invention.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, components, and/or groups, but do not preclude the presence or addition of one or more other features, integers, steps, operations, elements, components, and/or groups thereof. It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer, or section.

As used herein, the term "and/or" includes all combinations of one or more of the associated listed items. Expressions such as "at least one of," when preceding a list of elements, modify the entire list of elements and do not modify the individual elements of the list.

Hereinafter, exemplary embodiments of the present invention will be described with reference to the attached drawings.

Figure 1:
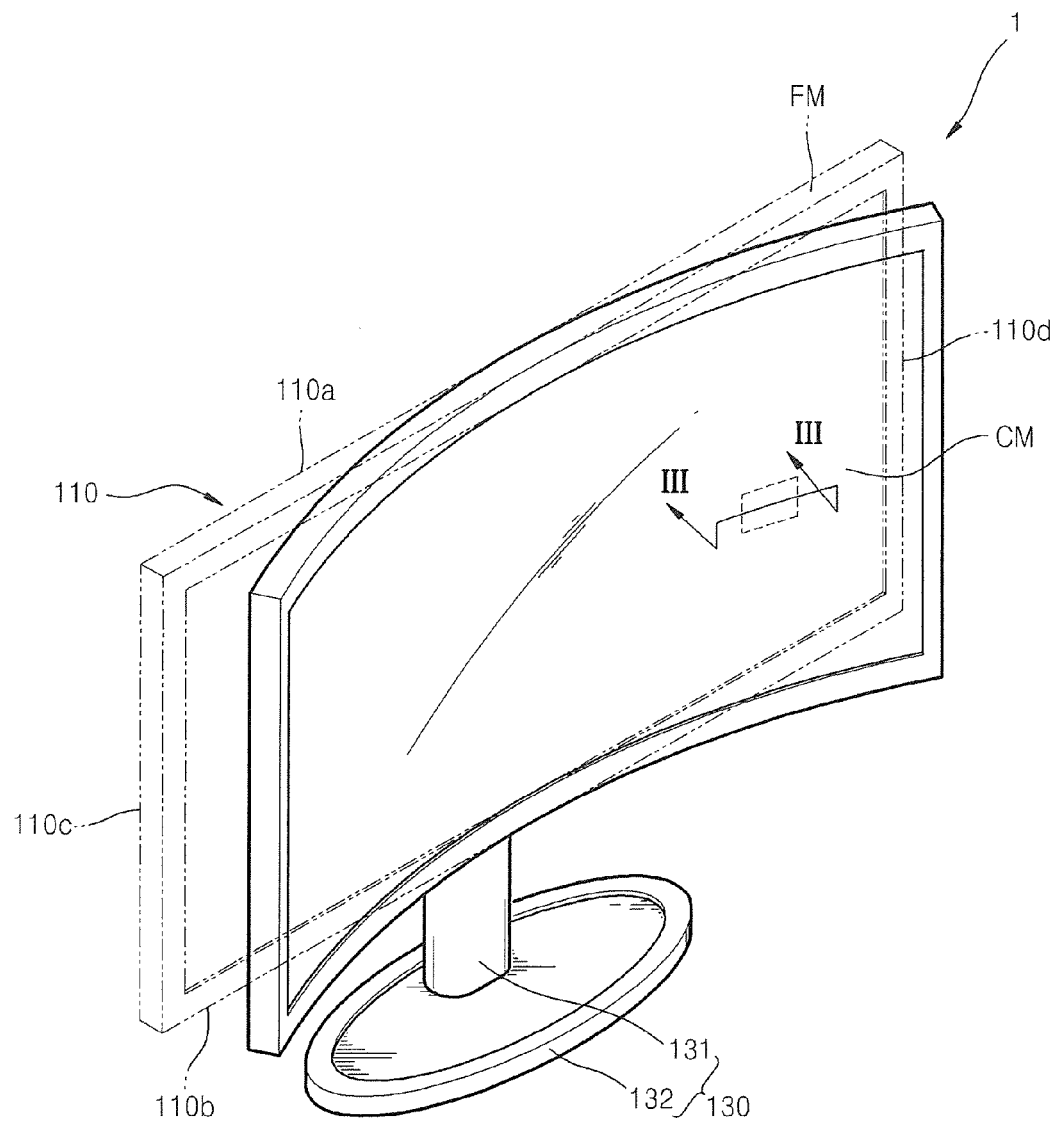
FIG. 1 is a schematic perspective view showing a flat mode and a curved mode of a display apparatus according to an embodiment of the present invention.
Figure 2:
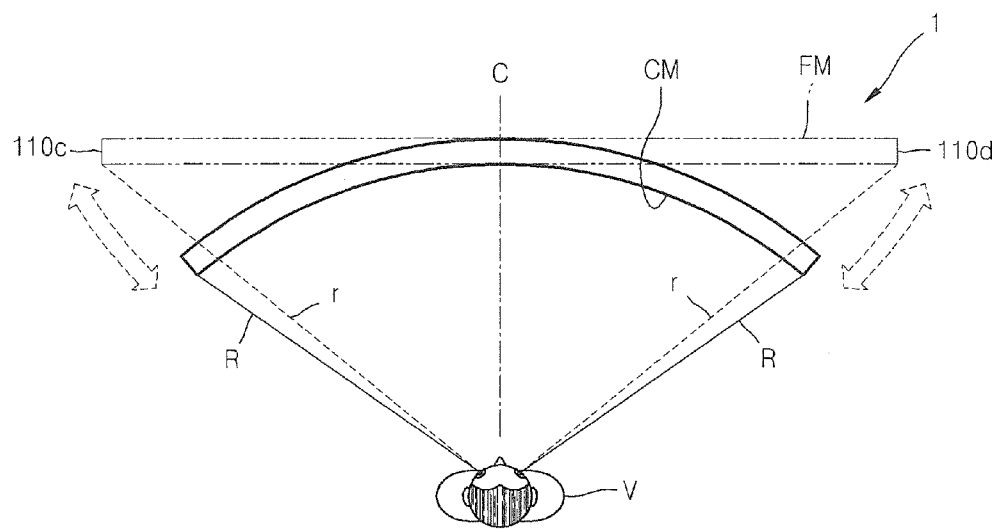
FIG. 2 is a schematic top view showing a relationship between shapes of the display apparatus of FIG. 1 and a viewer.

FIG. 1 is a schematic perspective view showing a flat mode FM and a curved mode CM of a display apparatus 1 according to an embodiment of the present invention. FIG. 2 is a schematic top view showing a relationship between shapes of the display apparatus 1 of FIG. 1 and a viewer V.

Referring to FIGS. 1 and 2, the display apparatus 1 includes a flexible display panel 110, which may selectively operate in the flat mode FM, the curved mode CM, or some variant between the flat mode FM and the curved mode CM (such as in the flat mode for a portion of the flexible display panel 110, and in the curved mode CM for another portion of the display panel 110).

As shown in FIG. 1, the flexible display panel 110 includes first and second long sides 110a and 110b that extend substantially in parallel to each other (and to the ground) in the flat mode FM, and first and second short sides 110c and 110d that extend substantially perpendicular to the first and second long sides 110a and 110b. Thus, in some embodiments, the flexible display panel 110 may be manufactured to have a substantially rectangular shape having four corners. The flexible display panel 110 may display visual data, such as TV programs, movies, or other video streams desired by the viewer V. Particularly, when the first and second long sides 110a and 110b of the flexible display panel 110 extend in a horizontal direction, a screen may be divided (for example, vertically and/or horizontally divided) and two or more video streams may be viewed on the same display apparatus 1.

The flexible display panel 110 of the display apparatus 1 according to the present embodiment of FIGS. 1 and 2 may be switched from the flat mode FM to the curved mode CM. In the curved mode CM, curvature of the flexible display panel 110 may increase in a direction from the center portion C of the flexible display panel 110 toward at least one side of the flexible display panel 110. For example, curvature of the flexible display panel 110 may increase symmetrically from the center portion C of the flexible display panel 110 toward two opposite sides in a horizontal direction, that is, to the first and second short sides 110c and 110d. In other words, in the curved mode CM, one inflection point is formed at the center portion C of the curved surface, curvature of the curved surface decreases from the first short side 110c toward the center portion C, and the curvature increases from the center portion C toward the second short side 110d. Here, the curvature refers to respective distances between the first and second short sides 110c and 110d (or between the center portion C and the first and second short sides 110c and 110d) in the flat mode FM, and between the first and second short sides 110c and 110d (or between the center portion C and the first and second short sides 110c and 110d) in the curved mode CM.

When the flexible display panel 110 extends in a horizontal direction and the viewer V is at a location substantially on a line extended from the center portion C of the display apparatus 1 as shown in FIG. 2, a distance r between the viewer V and the first and second short sides 110c and 110d in the flat mode FM is greater than a distance R between the viewer V and the first and second short sides 110c and 110d in the curved mode CM. In other embodiments, the relative difference between the distance from the viewer V to the center portion C of the display apparatus 1 and the distance from the viewer V to the first and second short sides 110c and 110d in the flat mode is greater than the relative difference between the distance from the viewer V to the center portion C and the distance from the viewer V to the first and second short sides 110c and 110d in the curved mode.

If the flexible display panel 110 extends in a horizontal direction and the display apparatus 1 is a large display apparatus, the differences of distances between the center portion C of a screen and sides of the screen increase when compared to smaller display apparatuses, and thus video images reach the viewer V at different angles (making, for example, image portions closer to the first and second short sides 110c and 110d more difficult to see by the viewer V). As a result, attention by the viewer V to the video stream may be reduced. However, according to the display apparatus of FIGS. 1 and 2, by switching the flat mode FM to the curved mode CM, distances between the viewer V and sides of a screen are reduced and thus, attention of the viewer V may increase.

Figure 3:
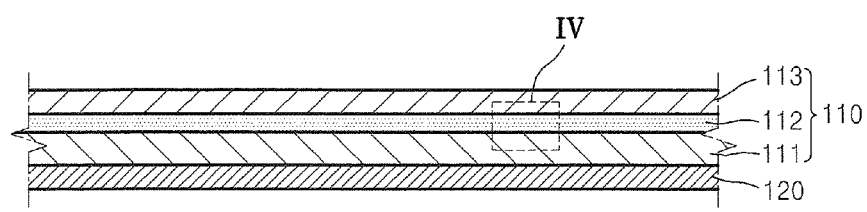
FIG. 3 is a sectional view taken along the line III-III of FIG. 1.

FIG. 3 is a sectional view taken along the line III-III of FIG. 1.

Referring to FIG. 3, the flexible display panel 110 includes a first flexible substrate 111, a second flexible substrate 113 arranged to face the first flexible substrate 111, and an organic light-emitting device 112 arranged between the first flexible substrate 111 and the second flexible substrate 113.

The first flexible substrate 111 may be formed of a plastic material with excellent heat resistance and durability, e.g., polyethylene terephthalate, polyethylene naphthalate, polycarbonate, polyarylate, polyethersulfone, or polyimide. However, the present invention is not limited thereto, and the first flexible substrate 111 may be formed of any of various flexible materials.

A barrier film (not shown) may be arranged on the first flexible substrate 111. The barrier film may include at least one of an inorganic film and an organic film. The barrier film prevents unnecessary elements from the first flexible substrate 111 to permeate into the organic light-emitting device 112.

Figure 4:
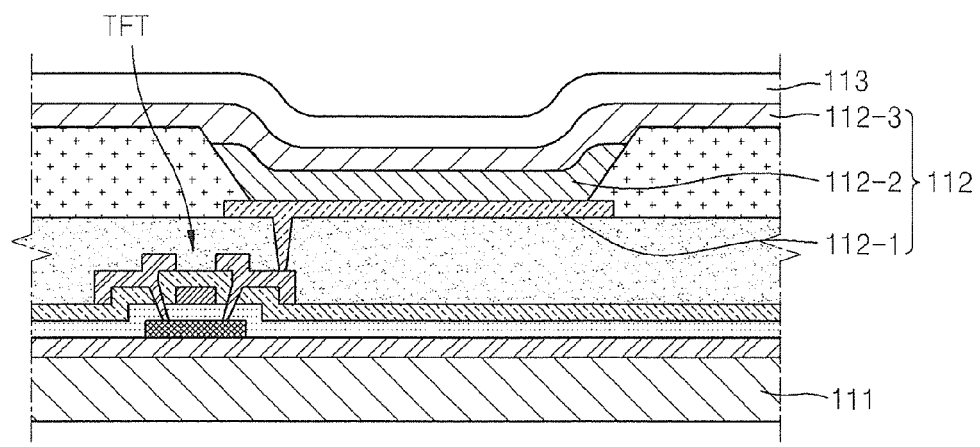
FIG. 4 is a magnified sectional view showing region IV of FIG. 3.

FIG. 4 is a magnified sectional view showing region IV of FIG. 3.

Referring to FIG. 4, the organic light-emitting device 112 includes a pixel electrode 112-1, a counter electrode 112-3 that is a common layer (e.g., a common electrode), and an organic light-emitting layer 112-2 arranged between the pixel electrode 112-1 and the counter electrode 112-2. The pixel electrode 112-1 is electrically connected to a driving thin-film transistor (TFT) formed on the first flexible substrate 111. Although not shown in FIG. 4, the organic light-emitting device 112 is electrically connected to a switching TFT and a storage capacitor.

The second flexible substrate 113 is arranged on the organic light-emitting device 112 as an encapsulating member for encapsulating the organic light-emitting device 112. The second flexible substrate 113 may be formed of a same material as the first flexible substrate 111 described above, may be formed of a plurality of inorganic layers, or may be formed of a combination of inorganic layers and organic layers. Although not shown in FIGS. 3 and 4, various other protection members may be further arranged on the first flexible substrate 111 and the second flexible substrate 113.

The organic light-emitting device 112 is a self-luminescent device in which organic polymer or organic monomer contained in the organic light-emitting layer 112-2 emits light due to a voltage difference between a voltage applied to the pixel electrode 112-1 and a voltage applied to the counter electrode 112-3. The organic light-emitting device 112 has many features that make it suitable for a flexible display apparatus. However, the applicability of the present invention is not limited to organic light-emitting devices. The present invention may be applied, for example, to a flexible liquid crystal device, or to any other flexible display apparatuses.

Referring back to FIG. 3, since the flexible display panel 110 has flexibility, it may be difficult to maintain shape of the flexible display panel 110 to properly display images thereon. To help resolve this possible problem, a shape deforming/maintaining unit 120 is arranged on a surface of the flexible display panel 110. For example, as shown in FIG. 3, the shape deforming/maintaining unit 120 is arranged on a surface of the flexible display panel 110, which is opposite to a surface for displaying images, i.e., shape deforming/maintaining unit 120 is arranged on a surface of the first flexible substrate 111.

The shape deforming/maintaining unit 120 deforms and maintains a shape of the flexible display panel 110 by enabling deformation of the flexible display panel 110 when it is switched between the flat mode FM and the curved mode CM, and by maintaining rigidity of the flexible display panel 110 when it is switched to the flat mode FM or to the curved mode CM.

Figure 5:
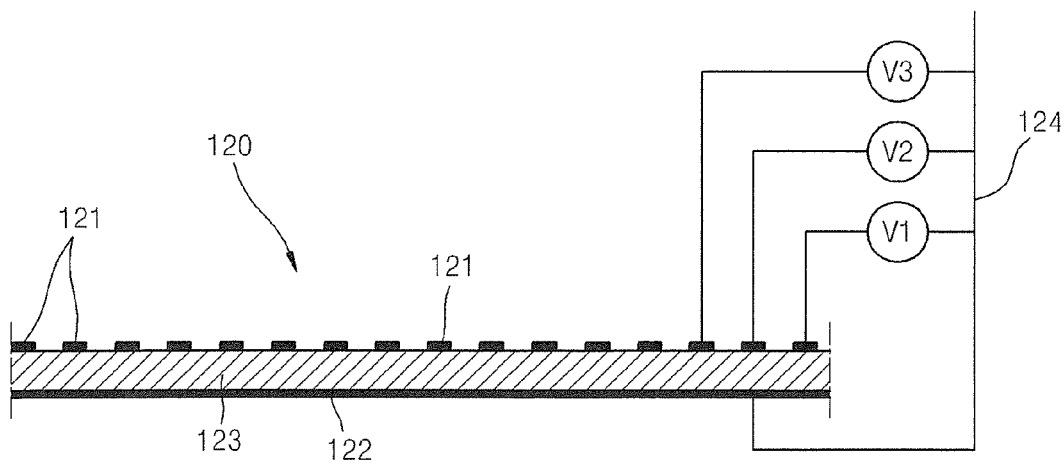
FIG. 5 is a diagram showing an example of a shape deforming/maintaining unit of FIG. 3.

FIG. 5 is a diagram showing an example of the shape deforming/maintaining unit 120 of FIG. 3.

Referring to FIG. 5, in the shape deforming/maintaining unit 120, an actuator 123 is arranged between a first electrode 121 and a second electrode 122. The first electrode 121 is divided into a plurality of parts that are arranged on a surface of the actuator 123 in parallel and are set apart by a distance (for example, a constant distance), whereas the second electrode 122 is arranged completely on the other surface of the actuator 123. When a circuit unit 124 applies voltages (for example, predetermined voltages) V1, V2, and V3 to each of the divided parts of the first electrode 121 and a voltage (for example, a predetermined voltage) to the second electrode 122 under control of a control unit (see FIG. 8), the actuator 123 changes shape in response to the applied voltages, and thus the curvature of the flexible display panel 110 arranged on a surface of the shape deforming/maintaining unit 120 may be controlled.

For example, when a first level voltage is applied, the actuator 123 does not change its shape, so that the flexible display panel 110 maintains the flat mode FM. When a second level voltage is applied, the actuator 123 changes its shape to bend the flexible display panel 110 to curve and thus the flexible display panel 110 is switched to the curved mode CM. When a third level voltage is applied, the actuator 123 does not change its shape, so that the flexible display panel 110 switched to the curved mode CM maintains the curved shape.

Thus, the actuator 123 may maintain rigidity when the first level voltage and the third level voltage are applied, and may become flexible when the second level voltage is applied. Here, the first level voltage may be identical to the third level voltage. Here, each of the first through third level voltages may be a specific voltage or within a specific voltage range. The actuator 123 may be formed of any of various materials, such as an electro-responsive polymer, a shape memory alloy, etc. Furthermore, the shape deforming/maintaining unit 120 may further include a protective film for protecting the first electrode 121 and the second electrode 122.

As described, by applying the second level voltage for switching the flexible display panel 110 from the flat mode FM to the curved mode CM to the shape deforming/maintaining unit 120 in a manner where the second level voltage increases or decreases (for example, constantly increases or decreases) from the center portion C of the flexible display panel 110 to two opposite sides curvature of the flexible display panel 110, the curved portions of the flexible display panel 110 at the two opposite sides in a horizontal direction may be symmetrical about the center portion C.

Figure 6:
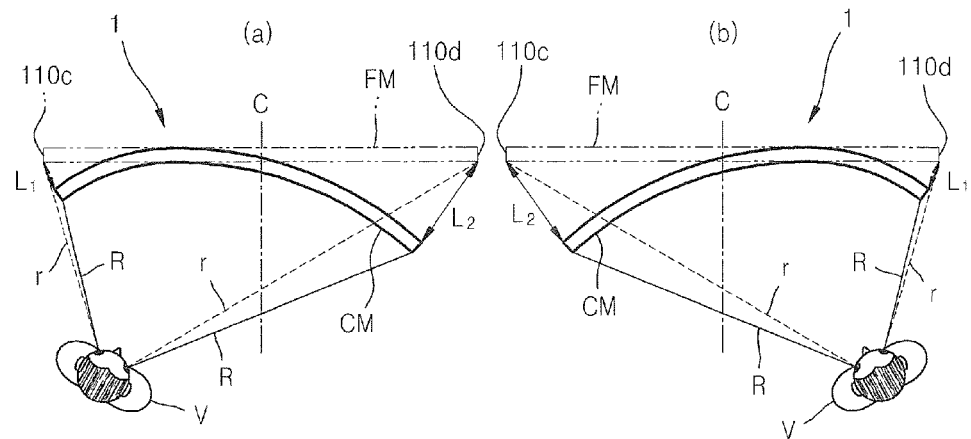
FIG. 6, which includes

FIG. 6, which includes FIGS. 6(*a*) and 6(*b*), is a schematic top view showing a relationship between the display apparatus 1 and the viewer V when the viewer V is off the line extending from the center portion C of the display apparatus 1.

Referring to FIG. 6(*a*), when the viewer V is located closer to the first short side 110*c* than to the second short side 110*d*, the curvature of a portion of the flexible display panel 110 between the center portion C and the second short side 110*d*, that is, a distance L2 between the second short side 110*d* in the flat mode FM and the second short side 110*d* in the curved mode CM, is greater than the curvature of a portion of the flexible display panel 110 between the center portion C and the first short side 110*c*, that is, a distance L1 between the first short side 110*c* in the flat mode FM and the first short side 110*c* in the curved mode CM. In other words, the second short side 110*d*, which is located farther from the viewer V than the first short side 110*c*, is curved more than the first short side 110*c*, which is located closer to the viewer V. At this point, a control unit (see FIG. 8) may control change of curvature by applying the second level voltage for switching the flexible display panel 110 from the flat mode FM to the curved mode CM, such that the second level voltage is changed (as applied to the shape deforming/maintaining unit 120) from the center portion C of the flexible display panel 110 to two opposite sides of the flexible display panel 110.

As a result, when the viewer V is located closer to the first short side 110*c* than to the second short side 110*d*, the distance R between the viewer V and the first and second short sides 110*c* and 110*d* in the curved mode CM is smaller than the corresponding distance r between the viewer V and the first and second short sides 110*c* and 110*d* in the flat mode FM. Therefore, the distance between the viewer V and sides of a screen is reduced, and thus attention of the viewer V may increase.

Referring to FIG. 6(*b*), when the viewer V is located closer to the second short side 110*d* than to the first short side 110*c*, the curvature of a portion of the flexible display panel 110 between the center portion C and the first short side 110*c*, that is, a distance L2 between the first short side 110*c* in the flat mode FM and the first short side 110*c* in the curved mode CM is greater than the curvature of a portion of the flexible display panel 110 between the center portion C and the second short side 110*d*, that is, a distance L1 between the second short side 110*d* in the flat mode FM and the second short side 110*d* in the curved mode CM. In other words, the first short side 110*c*, which is located farther from the viewer V than the second short side 110*d*, is curved more than the second short side 110*d*, which is located closer to the viewer V. At this point, the control unit may control change of curvature by applying the second level voltage for switching the flexible display panel 110 from the flat mode FM to the curved mode CM, such that the second level voltage is changed (as applied to the shape deforming/maintaining unit 120) from the center portion C of the flexible display panel 110 to two opposite sides of the flexible display panel 110.

As a result, when the viewer V is located closer to the second short side 110*d* than to the first short side 110*c*, the distance R between the viewer V and the first and second short sides 110*c* and 110*d* in the curved mode CM is smaller than the corresponding distance r between the viewer V and the first and second short sides 110*c* and 110*d* in the flat mode FM. Therefore, compared to the flat mode FM, the distance between the viewer V and sides of a screen is reduced, and thus attention of the viewer V may increase.

In FIG. 6, when the viewer V is off the line extending from the center portion C of the display apparatus 1, the center portion C of the flexible display panel is located differently in the flat mode FM than in the curved mode CM. In other words, the center portion C of the flexible display panel 110 is relocated.

If there is a sufficient space on the opposite side of the display apparatus 1 to display images, the display apparatus 1 may be rotated around a central axis to operate in a curved mode CV to face a viewer V. However, if there is an obstacle (e.g., a wall) on the opposite side of the display apparatus 1 for displaying images, e.g., a large-size TV, it is difficult to rotate the display apparatus 1 around the central axis. As such, it may be desired to relocate the center portion C of the flexible display panel 110.

Figure 7:
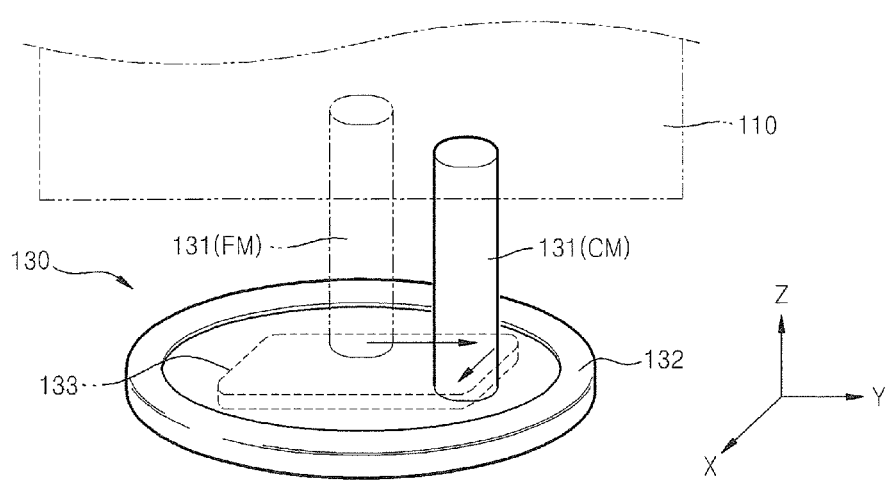
FIG. 7 is a diagram showing an example of a panel supporting unit.

Referring back to FIG. 1, the display apparatus 1 further includes a panel supporting unit 130, which supports the weight of the flexible display panel 110. The panel supporting unit 130 includes a wall unit 131 that combines with (for example, attaches to) the flexible display panel 110, and a base unit 132 that combines with (for example, attaches to) the wall unit 131 and is arranged in parallel to the ground (e.g., a ground surface). Here, the wall unit 131 may not be directly combined with the flexible display panel 110. For example, the wall unit 131 may be combined with the shape deforming/maintaining unit 120 formed on a surface of the flexible display panel 110. As shown in FIG. 7, to relocate the center portion C of the flexible display panel 110, it suffices to relocate the wall unit 131 attached to the flexible display panel 110.

FIG. 7 is a diagram showing an example of the panel supporting unit 130.

Referring to FIG. 7, the panel supporting unit 130 may include a movement guide 133 for moving the center portion C of the flexible display panel 110 (via the wall unit 131) on a plane. A control unit (see FIG. 8) may adjust the movement guide 133 to move the wall unit 131 in a first direction (the x-axis direction) and a second direction (the y-axis direction) by set distances (for example, predetermined distances). Although FIG. 7 shows a shape of the movement guide 133, it is merely an example, and the movement guide 133 and wall unit 131 may have any of various structures and shapes that enable the center portion C of the flexible display panel 110 to be moved on a plane.

Although FIGS. 1 and 7 show that the panel supporting unit 130 is placed on the ground, the present invention is not limited thereto. In other embodiments, the panel supporting unit 130 may be installed on a wall or the ceiling.

Figure 8:
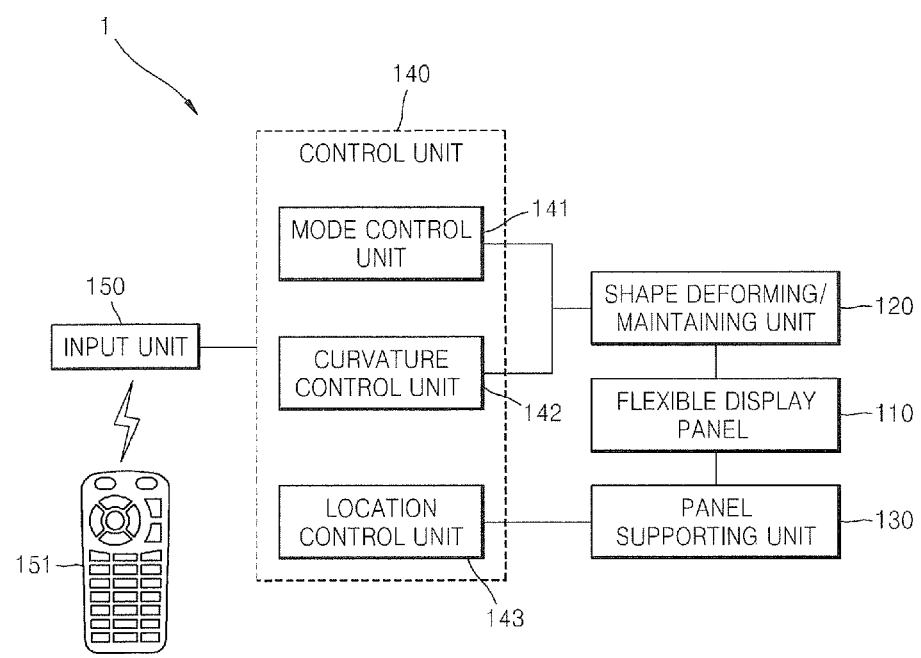
FIG. 8 is a schematic block diagram of the display apparatus according to an embodiment of the present invention.

FIG. 8 is a schematic block diagram of the display apparatus 1 according to an embodiment of the present invention.

Referring to FIG. 8, the display apparatus 1 includes the flexible display panel 110, the shape deforming/maintaining unit 120, the panel supporting unit 130, and a control unit 140. The control unit 140 controls the shape deforming/maintaining unit 120 and the panel supporting unit 130 to switch modes, change curvature, or relocate the center portion of the flexible display panel 110.

For example, when a viewer provides a mode switch control instruction by using a remote control 151, the mode switch control instruction received by an input unit 150 is forwarded to a mode control unit 141 of the control unit 140. Accordingly, the mode control unit 141 changes shape of the shape deforming/maintaining unit 120 by applying a set voltage level (for example, a predetermined voltage level) to the shape deforming/maintaining unit 120, and thus the flexible display panel 110 may be switched between the flat mode FM and the curved mode CM.

In addition, when a viewer provides a curvature change control instruction by using the remote control 151, the curvature change control instruction received by the input unit 150 is forwarded to a curvature control unit 142 of the control unit 140. Accordingly, the curvature control unit 142 may change curvature by applying a voltage that varies according to locations to the shape deforming/maintaining unit 120.

Furthermore, when a viewer provides a center portion relocation control instruction by using the remote control 151, the center portion relocation control instruction received by the input unit 150 is forwarded to a location control unit 143 of the control unit 140. Accordingly, the location control unit 143 may relocate the center portion C of the flexible display panel 110 by controlling movement of the panel supporting unit 130.

Although FIG. 8 shows that a control instruction issued by the remote control 151 is received by the input unit 150 and is forwarded to the control unit 140, the present invention is not limited thereto. Instead of the remote control 151, in other embodiments, a control instruction may be transmitted to the control unit 140 by human motion. The display apparatus 1 may further include a sensor (not shown) for sensing human movements. For example, the sensor may be a face detecting sensor, a retina detecting sensor, or a motion detecting sensor. By using such sensors, control instructions may be transmitted to the mode control unit 141, the curvature control unit 142, and/or the location control unit 143.

According to embodiments described above, images may be viewed in the curved mode CM, and thus attention of a viewer may increase. Furthermore, since the display apparatus 1 may be freely switched between the flat mode FM and the curved mode CM, images may be viewed in suitable modes, thus satisfying user demand. Furthermore, when a display apparatus is not used or is transported or shipped, the display apparatus may be switched to the flat mode to lessen or prevent damage.

Although the rectangular flexible display panel 110 as described above has a horizontal side that is longer than the vertical side, is provided in the above embodiment, the present invention is not limited thereto. As non-limiting examples, the present invention may also be applied to a rectangular display panel in which the vertical side is longer than the horizontal side, or to a square display panel in which the horizontal sides are the same length as the vertical sides.

Figure 9:
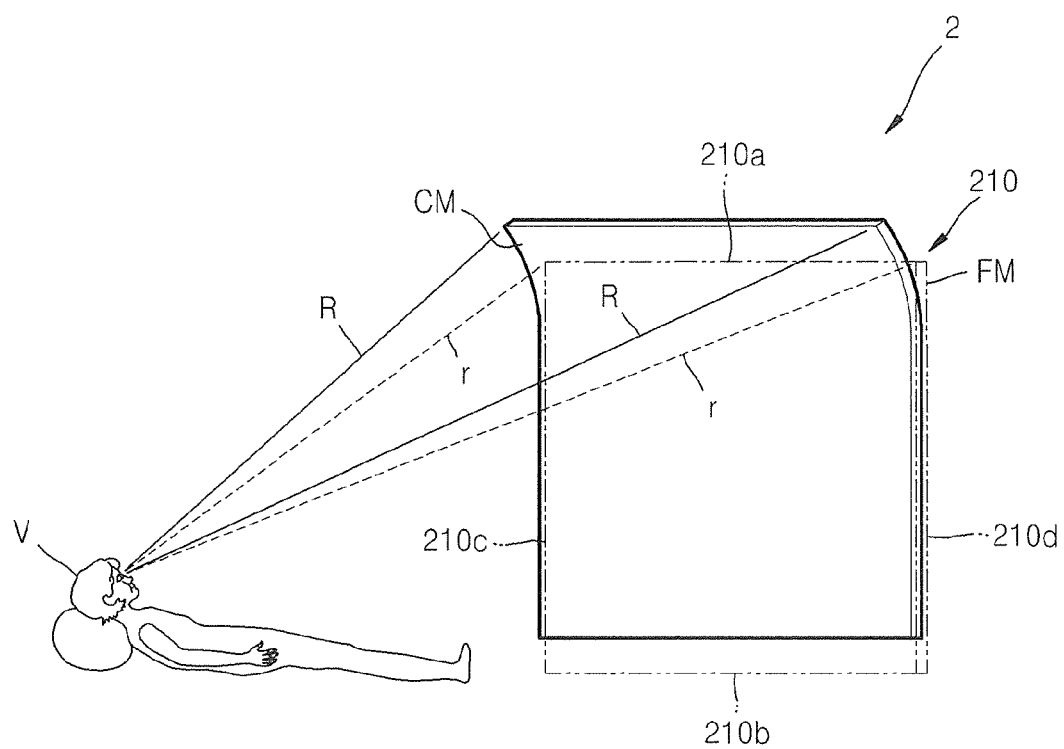
FIG. 9 is a schematic perspective view showing a display apparatus in the flat mode and in the curved mode, according to another embodiment of the present invention.
Figure 10:
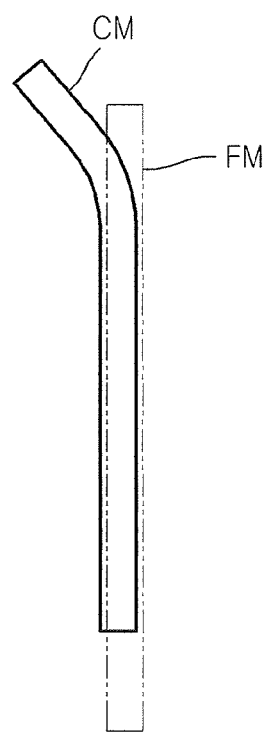
FIG. 10 is a lateral view of the display apparatus of FIG. 9.

FIG. 9 is a schematic perspective view showing a display apparatus 2 in the flat mode FM and in the curved mode CM, according to another embodiment of the present invention. FIG. 10 is a lateral view of the display apparatus 2 of FIG. 9.

Referring to FIGS. 9 and 10, the display apparatus 2 includes a flexible display panel 210, which may selectively operate in the flat mode FM or the curved mode CM.

The flexible display panel 210 includes first and second short sides 210a and 210b that extend in parallel to each other in the flat mode FM, and first and second long sides 210c and 210d that extend in directions substantially perpendicular to the first and second short sides 210a and 210b. The flexible display panel 210 may be manufactured to have a substantially rectangular shape having four sides. Although FIGS. 9 and 10 show a rectangular shape in which the first and second long sides 210c and 210d, which extend in parallel to each other in a direction vertical to the ground, are longer than the first and second short sides 210a and 210b, that is, vertical sides are longer than horizontal sides, the present invention is not limited thereto. As non-limiting examples, the present invention may also be applied to a rectangular display panel in which widths are longer than lengths or a square display panel.

In the flexible display panel 210 of the display apparatus 2, when the flexible display panel 210 is switched from the flat mode FM to the curved mode CM, curvature increases toward a horizontal side with respect to the center portion C of the flexible display panel 210, that is, toward the first short side 210a.

When the viewer is located substantially below a line extending from the center portion C of the display apparatus 2, e.g., the viewer V watches the display apparatus 2 in a reclining position or lying position, curvature of the first short side 210a at the top of the flexible display panel 210 may be adjusted and the center portion C of the flexible display panel 210 may be relocated upward (e.g., in a direction parallel to the flexible display panel 210 in the flat mode FM). Therefore, a distance R between the viewer V and the first short side 210a in the curved mode CM is smaller than distance r between the viewer V and the first short side 210a in the flat mode FM. Therefore, even if the viewer V watches the display apparatus 2 in a reclining position or lying position, a distance between the viewer V and sides of the flexible display panel 210 in the curved mode CM may be smaller than that in the flat mode FM, and thus attention of the viewer V may increase.

Aspects of the present invention may have one of more of the following effects. First, images may be viewed in a curved mode, and thus attention of a viewer may increase. Second, the display apparatus may be freely switched between a curved mode and a flat mode, and thus images may be viewed in suitable modes and user demand may be satisfied. Third, when a display apparatus is not used or is transported or shipped, the display apparatus may be switched to the flat mode to reduce or prevent damage While the present invention has been particularly shown and described with reference to exemplary embodiments thereof, it will be understood by those of ordinary skill in the art that various changes in form and details may be made therein without departing from the spirit and scope of the present invention as defined by the following claims, and equivalents thereof.

What is claimed is:
1. A display apparatus comprising:
   a flexible display panel configured to operate in a flat mode and in a curved mode; and
   a shape deforming/maintaining unit on a surface of the flexible display panel and configured to deform a shape of the flexible display panel during switching between the flat mode and the curved mode, and to maintain rigidity of the flexible display panel after switching to the flat mode or to the curved mode.

2. The display apparatus of claim 1, wherein the shape deforming/maintaining unit is on a surface of the flexible display panel opposite to a surface for displaying images.

3. The display apparatus of claim 1, wherein, in the curved mode, curvatures of the flexible display panel at two opposite sides in a horizontal direction are symmetrical about a center portion of the flexible display panel.

4. The display apparatus of claim 1, wherein, in the curved mode, curvature from a center portion of the flexible display panel toward a first side of the flexible display panel in a horizontal direction is greater than curvature from the center portion of the flexible display panel toward a second side of the flexible display panel in the horizontal direction.

5. The display apparatus of claim 1, wherein, in the curved mode, curvature from a center portion of the flexible display panel toward a first end of the flexible display panel in a vertical direction increases.

6. The display apparatus of claim 1, wherein the shape deforming/maintaining unit comprises:
a first electrode divided into a plurality of parts;
a second electrode, which is a common electrode facing the first electrode; and
an actuator between the first electrode and the second electrode,
wherein shapes of the flexible display panel for switching between the flat mode and the curved mode are determined according to voltages applied to the actuator.

7. The display apparatus of claim 6, wherein the shape deforming/maintaining unit has flexibility at a voltage level for changing a shape of the actuator and has rigidity at a voltage level for not changing the shape of the actuator.

8. The display apparatus of claim 1, further comprising a panel supporting unit for supporting a weight of the flexible display panel.

9. The display apparatus of claim 8, wherein the panel supporting unit comprises a movement guide for relocating a center portion of the flexible display panel.

10. The display apparatus of claim 9, wherein the panel supporting unit is configured to relocate the center portion of the flexible display panel on a plane.

11. The display apparatus of claim 9, wherein the panel supporting unit is configured to relocate the center portion of the flexible display panel in a direction parallel to the flexible display panel when in the flat mode.

12. The display apparatus of claim 1, wherein the flexible display panel comprises liquid crystal devices or organic light-emitting devices.

13. A display apparatus comprising:
a flexible display panel configured to operate in a flat mode and in a curved mode;
a shape deforming/maintaining unit on a surface of the flexible display panel; and
a control unit for controlling the shape deforming/maintaining unit to operate in the flat mode or in the curved mode.

14. The display apparatus of claim 13, wherein the control unit is configured to control the shape deforming/maintaining unit to deform a shape of the flexible display panel during switching between the flat mode and the curved mode, and to maintain rigidity of the flexible display panel after switching to the flat mode or to the curved mode.

15. The display apparatus of claim 13, wherein the control unit is configured to control curvature of the flexible display panel by controlling voltages respectively applied to locations of the shape deforming/maintaining unit.

16. The display apparatus of claim 13, further comprising a panel supporting unit for supporting a weight of the flexible display panel, wherein the control unit is configured to control the panel supporting unit to relocate a center portion of the flexible display panel.

17. The display apparatus of claim 13, wherein the control unit is configured to control curvature and location of the flexible display panel, such that a distance between a viewer and sides of the flexible display panel in the curved mode is smaller than a distance between the viewer and the sides of the flexible display panel in the flat mode.

18. The display panel of claim 13, wherein the control unit is configured to be controlled by control instructions received from a remote control.

19. The display panel of claim 13, wherein the control unit is configured to control curvature of the flexible display panel based on human motion.

20. The display apparatus of claim 19, further comprising a sensor for detecting the human motion.

21. The display apparatus of claim 20, wherein the sensor is a face detecting sensor, a retina detecting sensor, or a motion detecting sensor.

22. A display apparatus comprising:
a flexible display panel configured to operate in a flat mode and in a curved mode;
a panel supporting unit for supporting a weight of the flexible display panel; and
a shape deforming/maintaining unit on a surface of the flexible display panel and configured to deform a shape of the flexible display panel during switching between the flat mode and the curved mode, and to maintain rigidity of the flexible display panel after switching to the flat mode or to the curved mode,
wherein a distance between a viewer and sides of the flexible display panel in the curved mode is smaller than a distance between the viewer and the sides of the flexible display panel in the flat mode.

23. The display apparatus of claim 22, wherein
the flexible display panel comprises first and second long sides extending substantially in parallel to a ground surface and first and second short sides extending in a direction substantially perpendicular to the first and second long sides, and
curvature of the flexible display panel increases toward the first and second short sides in the curved mode.

24. The display apparatus of claim 23, wherein, in the curved mode, curvatures of the flexible display panel from a center portion toward each of the first and second short sides are symmetrical with each other.

25. The display apparatus of claim 23, wherein, in the curved mode, curvatures of the flexible display panel from a center portion of the flexible display panel toward each of the first and second short sides of the flexible display panel are asymmetrical with each other.

26. The display apparatus of claim 22, wherein
the flexible display panel comprises first and second long sides extending in a direction substantially vertical to a ground surface and first and second short sides extending in a direction substantially perpendicular to the first and second long sides,
the first short side is above the second short side, and
curvature of the flexible display panel increases toward the first short side in the curved mode.

27. The display apparatus of claim 22, wherein the flexible display panel is configured to move in a direction substantially vertical to a ground surface.

28. The display apparatus of claim 22, wherein the shape deforming/maintaining unit comprises:
a first electrode divided into a plurality of parts;
a second electrode, which is a common electrode facing the first electrode; and
an actuator between the first electrode and the second electrode,
wherein shapes of the flexible display panel for switching between the flat mode and the curved mode are determined according to voltages applied to the actuator.

29. The display apparatus of claim 28, wherein the shape deforming/maintaining unit has flexibility at a voltage level for changing a shape of the actuator and has rigidity at a voltage level for not changing a shape of the actuator.

30. The display apparatus of claim 22, wherein the flexible display panel comprises:
a first flexible substrate;
a second flexible substrate facing the first flexible substrate; and
an organic light-emitting device between the first flexible substrate and the second flexible substrate.

* * * * *